United States Patent Office 3,293,263
Patented Dec. 20, 1966

3,293,263
DIPHENYLBENZOCYCLOALKENES
Daniel Lednicer, Portage Township, Kalamazoo County, Mich., assignor to The Upjohn Company, Kalamazoo, Mich., a corporation of Delaware
No Drawing. Filed Dec. 9, 1963, Ser. No. 329,220
16 Claims. (Cl. 260—326.5)

This invention relates to novel diphenylbenzocycloalkenes and is more particularly concerned with substituted 2,3 - diphenylindenes, 1,2-diphenyl-3,4-dihydronaphthalenes, and derivatives thereof, and with processes for their preparation.

The novel compounds of the invention can be represented by the following formula:

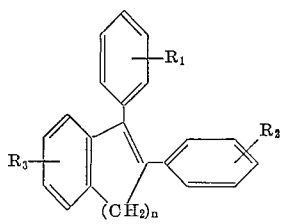

wherein $R_1$ is selected from the class consisting of hydrogen, lower-alkyl, trifluoromethyl, lower-alkenyl, lower-alkenyloxy, halogen, lower-alkylmercapto,

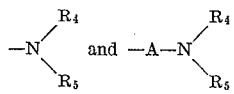

wherein $R_4$ and $R_5$ taken individually represent lower-alkyl and $R_4$ and $R_5$ taken together with the attached nitrogen atom represent a 5 to 7 ring atom saturated heterocyclic radical, and A is an alkylene group containing from 1 to 6 carbon atoms, inclusive; $R_2$ represents at least one substituent selected from the class consisting of hydrogen, lower-alkyl, trifluoromethyl, lower-alkenyl, lower-alkenyloxy, halogen, lower-alkylmercapto and

wherein $R_4$ and $R_5$ have the significance above defined; $R_3$ represents at least one substituent selected from the class consisting of hydrogen, hydroxy, lower-alkyl, trifluoromethyl, lower-alkenyl, lower-alkoxy, lower-alkenyloxy, halogen, lower-alkylmercapto and

wherein $R_4$ and $R_5$ have the significance above defined, provided that $R_1$, $R_2$ and $R_3$ do not each represent hydrogen simultaneously; and $n$ is an integer from 1 to 2, inclusive.

The pharmacologically acceptable acid addition salts and quaternary ammonium salts of the compounds of the above Formula I, wherein one or more of the groups $R_1$, $R_2$ and $R_3$ is basic, are also included within the scope of the present invention.

The term "lower-alkyl" means an alkyl group containing from 1 to 8 carbon atoms, inclusive, such as methyl, ethyl, propyl, butyl, pentyl, hexyl, heptyl, octyl, and isomeric forms thereof. The term "lower-alkenyl" means an alkenyl group containing from 2 to 8 carbon atoms, inclusive, such as vinyl, allyl, butenyl, pentenyl hexenyl, heptenyl, octenyl, and isomeric forms thereof. The term "lower-alkoxy" means an alkoxy group containing from 1 to 8 carbon atoms, inclusive, such as methoxy, ethoxy, propoxy, butoxy, pentyloxy, hexyloxy, heptyloxy, octyloxy, and isomeric forms thereof. The term "lower-alkenyloxy" means an alkenyloxy group containing from 2 to 8 carbon atoms, inclusive, such as vinyloxy, allyloxy, butenyloxy, pentenyloxy, hexenyloxy, heptenyloxy, octenyloxy, and isomeric forms thereof. The term "halogen" is inclusive of fluorine, chlorine, bromine, and iodine. The term "lower-alkylmercapto" means an alkylmercapto group containing from 1 to 8 carbon atoms, inclusive, such as methylmercapto, ethylmercapto, propylmercapto, butylmercapto, pentylmercapto, hexylmercapto, heptylmercapto, octylmercapto, and isomeric forms thereof. The term "alkylene group containing from 1 to 6 carbon atoms, inclusive" includes methylene, ethylene, propylene, butylene, pentylene, hexylene, and isomeric forms thereof. The term "a 5 to 7 ring atom saturated heterocyclic radical" is inclusive of pyrrolidino, lower-alkylpyrrolidino such as 2-methylpyrrolidino, 2,2-dimethylpyrrolidino, 3-methylpyrrolidino, and the like, piperazino, lower-alkylpiperazino, such as 2-methylpiperazino, 4-methylpiperazino, 2,4-dimethylpiperazino, and the like, piperidino, lower-alkylpiperidino such as 2-methylpiperidino, 3-methylpiperidino, 4,4-dimethylpiperidino, and the like, morpholino, hexamethylenimino, homopiperazino, homomorpholino, and the like.

These compounds of the Formula I, wherein one or more of the groups $R_1$, $R_2$ and $R_3$ is basic, can also exist in the form of acid addition salts and quarternary ammonium salts. Said acid addition salts comprise the salts of the above free bases of Formula I with pharmacologically acceptable acids such as sulfuric, hydrochloric, nitric, phosphoric, lactic, benzoic, methanesulfonic, p-toluenesulfonic, salicylic, acetic, propionic, maleic, malic, tartaric, citric, cyclohexylsulfamic, succinic, nicotinic, ascorbic acids, and the like. Said quaternary ammonium salts comprise salts obtained by reacting the free bases of Formula I with quarternating agents, for example, lower-alkyl halides, lower-alkenyl halides, di(lower-alkyl) sulfates, aralkyl halides, lower-alkyl arylsufonates, and the like. The terms "lower-alkyl" and "lower-alkenyl" have the significance hereinbefore defined. The term "aralkyl" means an aralkyl group containing from 7 to 13 carbon atoms, inclusive, such as benzyl, phenethyl, phenylpropyl, benzhydryl, and the like. The term "lower-alkyl arylsulfonates" means the esters formed from lower alkanols and arylsulfonic acids such as benzenesulfonic, toluenesulfonic, xylenesulfonic, and like acids. Examples of quaternary salts of the basic compounds of Formula I are the methobromide, methiodide, ethobromide, propyl chloride, butyl bromide, octyl bromide, methyl methosulfate, ethyl ethosulfate, allyl chloride, allyl bromide, benzyl bromide, benzhydryl chloride, methyl p-toluenesulfonate, ethyl p-toluenesulfonate, and the like.

The term "novel compounds of the invention" as used throughout the specification embraces the compounds of Formula I and the acid addition and quarternary ammonium salts of those compounds of Formula I wherein one or more of the groups $R_1$, $R_2$ and $R_3$ is basic.

The novel compounds of the invention exhibit biological activity. Thus, the novel compounds of the invention possess activity as antifertility, estrogenic, antiestrogenic and hypocholesteremic agents. Illustratively, the compound 1,2-diphenyl-6-methoxy-3,4-dihydronaphthalene exhibits oral antifertility activity in rats when tested by the method described by Duncan et al., Proc. Soc. Exp. Biol. Med. 112, 439–442, 1963.

The compounds (I) of the invention are valuable for animal pest control. For example, the compounds of the invention are formulated in combination with baits and/or attractants and placed in feeding stations accessible to undesirable rodents and other small animals and birds, for example, starlings and the like, thus reducing hazards to aviation by their presence on runways and in the vicinity of airfields.

For purposes of administration to birds and to mammals, including animals of economic value, the novel compounds of the invention can be combined with solid or liquid pharmaceutical carriers and formulated in the form of tablets, powder packets, capsules, and like solid dosage forms, using starch and like excipients, or dissolved or suspended in suitable solvents or vehicles, for oral or parenteral administration.

The novel compounds having the Formula I above can be prepared according to the following reaction scheme:

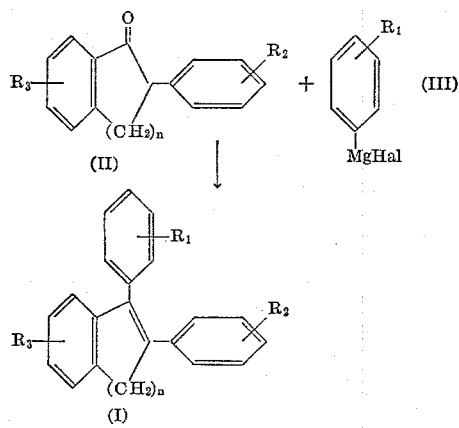

In the above formulae $R_1$, $R_2$, $R_3$, and $n$ have the significance hereinbefore defined and Hal represents halogen.

In the above reaction, the ketone (II) is reacted with the Grignard reagent (III) under conditions conventionally employed in conducting Grignard reactions. Thus, the reaction is carried out under anhydrous conditions, advantageously in the presence of an inert solvent such as dibutyl ether, diisopropyl ether, tetrahydrofuran, and the like. The preferred solvent is tetrahydrofuran. The reaction can be carried out at temperatures within the range of about 0° C. to about the boiling point of the solvent employed, and preferably is carried out within the range of about 15° to about 30° C.

The desired product (I) can be isolated from the reaction mixture by conventional procedures. For example, the reaction mixture from the above-described Grignard reaction is decomposed by the addition of water, ammonium chloride, and the like, followed by separation of the organic layer and removal of the solvent therefrom. The residue is purified, if desired, by conventional procedures, for example, by chromatography, recrystallization, and the like.

The desired compound (I) produced in the above-described reaction, is generally contaminated with appreciable quantities of the corresponding carbinol having the Formula IV. In many cases the carbinol (IV) is the major product of the above reaction.

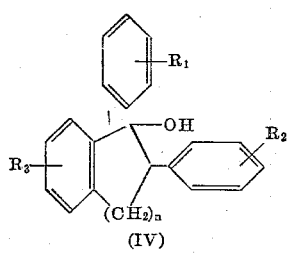

In the above formula $R_1$, $R_2$, $R_3$ and $n$ have the significance above defined. Where the major product of the above-described reaction is compound (IV) or a mixture of the desired compound (I) and the carbinol (IV), said product can be treated by procedures known to effect the dehydration of a tertiary carbinol whereby the carbinol is converted to the desired compound (I). The dehydration can be effected in most instances by heating the carbinol (IV) in a solvent such as benzene, toluene, xylene, and the like, which forms an azeotrope with water, in the presence of a strong acid such as hydrochloric, sulfuric, p-toluenesulfonic acids, and the like. The water which is formed in the dehydration is removed from the reaction mixture azeotropically. There is thereby obtained a solution of the desired compound (I) from which the latter can be isolated by evaporation or other conventional procedures. In certain cases, the dehydration of the carbinol (IV) requires more drastic conditions such as heating the compound at, or slightly above, its melting point, preferably in the presence of an inert gas, until elimination of water is complete.

The compounds having the Formula IV as well as the pharmacologically acceptable acid addition salts and quaternary ammonium salts of those compounds of Formula IV wherein one or more of the groups $R_1$, $R_2$ and $R_3$ is basic, are included within the scope of the present invention.

When the group $R_3$ in the starting ketone (II) represents free hydroxy, it is necessary, before carrying out the Grignard reaction described above, to protect this group with a radical which can be removed subsequently to yield the desired compound (I) with a free hydroxy group or groups. A particularly convenient manner in which a free hydroxy group or groups in the starting ketone (II) can be so protected is by conversion to the corresponding tetrahydropyranyl ether. The latter conversion can be accomplished readily by treating the ketone (II) containing a free hydroxy group or groups with 2,3-dihydropyran in the presence of a trace of p-toluenesulfonic acid or a mineral acid such as hydrochloric acid, hydrobromic acid, and the like. After the ketone (II) with hydroxy group or groups protected in this manner has been converted to the corresponding compound (I), the tetrahydropyranyl ether groups are hydrolyzed, preferably by mineral acid hydrolysis, to yield the free hydroxy group or groups.

The Grignard reagents (III) employed as starting materials in the above-described process of the invention are prepared by reaction of magnesium in an anhydrous inert organic solvent such as dibutyl ether, diisopropyl ether, tetrahydrofuran, and the like, with the appropriately substituted halobenzene using procedures well known in the art for the preparation of Grignard reagents.

The halobenzenes from which the Grignard reagents (III) are prepared are, for the most part, known compounds which can be prepared by procedures conventional in the art for the preparation of halobenzenes; see, for example, Chemistry of Carbon Compounds, Volume IIIA, p. 113 et seq., 1954, Editor E. H. Rodd [Elsevier Publishing Company]. The halobenzenes in which $R_1$ is

(wherein A, $R_4$ and $R_5$ have the significance hereinbefore defined) can be prepared by the formation and reduction of the appropriately substituted amide of the corresponding benzoic or phenylalkanoic acid as described hereafter in Preparations 7 and 8.

The ketones (II) which are employed as starting materials in the above-described process of the invention are prepared as follows. Those ketones (II) wherein $n$ is 1, i.e., those compounds of Formula II which are indanones, except those wherein $R_3$ represents hydroxy, or $R_2$ and/or $R_3$ represent alkenyloxy, can be prepared according to the following reaction scheme:

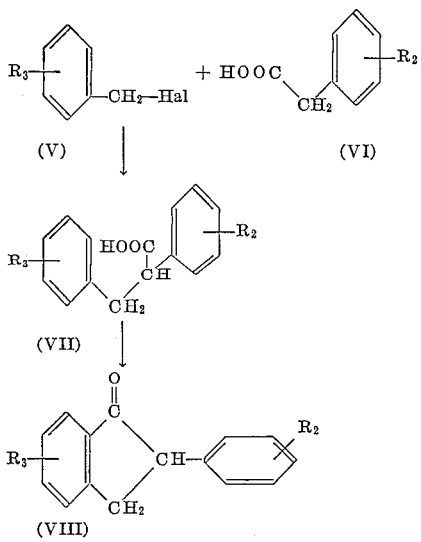

In the above formulae $R_2$ and $R_3$ have the significance hereinbefore defined, with the exceptions noted above, and Hal represents halogen. It is to be noted that the benzyl halide (V) must be unsubstituted in at least one of the ortho positions in order that the compound (VII) can be cyclized as described below. The reaction of the phenylacetic acids (VI) with the benzyl halides (V) to give the corresponding α-phenylhydrocinnamic acids (VII) can be effected, for example, using the procedure described by Hauser and Chambers, J. Am. Chem. Soc. 78, 4942, 1956, for the preparation of α-phenylhydrocinnamic acid from phenylacetic acid and benzyl chloride. The α-phenylhydrocinnamic acids (VII) can also be prepared by Perkin condensation of a phenylacetic acid (VI) with the appropriately substituted benzaldehyde, followed by reduction of the intermediate α-phenylcinnamic acid so obtained. The procedure employed in this alternate synthesis is preferably that described by Solmssen, J. Am. Chem. Soc. 65, 2370, 1943.

The α-phenylhydrocinnamic acids (VII) so obtained are then cyclized to the required indanones (VIII) in the presence of a Lewis acid, using the general procedure described by Fieser and Hershberg, J. Am. Chem. Soc. 61, 1272, 1939. The term "Lewis acid" is well known in the art and is defined succinctly by Fieser and Fieser, "Organic Chemistry," Third Edition, page 138 (Reinhold, 1956). Examples of such compounds are hydrogen fluoride, boron trifluoride, arsenic trifluoride, phosphorus pentafluoride, titanium tetrafluoride, concentrated sulfuric acid, polyphosphoric acid, and the like. The preferred Lewis acid for use in the above process is hydrogen fluoride.

A particularly convenient method of cyclizing the α-phenylhydrocinnamic acids (VII) according to the above procedure comprises adding the acid (VII) to liquid hydrogen fluoride with stirring and then allowing the hydrogen fluoride to evaporate at room temperature. The desired indanone (VIII) is then isolated from the residue by conventional methods, for example, by dissolving the residue in a suitable solvent such as ether, washing the solution so obtained with an aqueous solution of a base such as sodium carbonate, sodium hydroxide, and the like, and then evaporating the washed solution to dryness. The indanone (VIII) so obtained can be purified, if desired, by conventional procedures, for example, by distillation.

The indanones of Formula VIII wherein $R_3$ represents hydroxy can be prepared conveniently by dealkylation of the corresponding compounds of Formula VIII in which $R_3$ represents alkoxy. The dealkylation can be effected using conventional methods, for example, by heating with aluminum chloride or bromide in the presence of an inert solvent such as benzene, xylene, and the like.

The indanones of Formula VIII wherein $R_2$ or $R_3$ represents alkenyloxy can be prepared conveniently by alkenylation of the corresponding compounds wherein $R_2$ or $R_3$ represents hydroxy. The alkenylation can be effected using conventional procedures, for example, by reacting the free hydroxy compound with the appropriate alkenyl halide in the presence of a base such as potassium carbonate, sodium methoxide, and the like.

The benzyl halides (V) which are employed as starting materials in the above-described preparation, many of which are known in the art, can themselves be prepared from the correspondingly substituted benzoic acids, for example, by reduction of said acids or simple alkyl esters thereof, for example, with lithium aluminum hydride according to the procedure described by Nystrom and Brown, J. Am. Chem. Soc. 69, 2548, 1947. The benzyl alcohols so obtained are then converted to the corresponding benzyl halides (V) using procedures known in the art, for example, that described by Gilman and Kirby, J. Am. Chem. Soc. 51, 475, 1929.

The phenylacetic acids (VI), which are employed as starting materials in the above-described preparation, many of which are known in the art (see, for example, Corse et al., J. Am. Chem. Soc. 70, 2837, 1948) can themselves be prepared from the corresponding benzyl halides (V) by procedures well known in the art. For example, the benzyl halides (V) can be reacted with an alkali metal cyanide, such as sodium cyanide, to form the corresponding benzyl cyanide which latter is then hydrolyzed, for example, using an aqueous mineral acid or aqeous alkali, to yield the desired phenylacetic acid (VI). A suitable procedure for carrying out the conversion of the benzyl halide (V) to the phenylacetic acid (VI) is that described by Silverman and Bogert, J. Org. Chem. 11, 34, 1946.

The starting ketones of Formula II wherein $n$ is 2, i.e., the compounds of Formula II which are α-tetralones, except those wherein $R_3$ represents hydroxy or $R_2$ and $R_3$ represent alkenyloxy can be prepared according to the following reaction scheme:

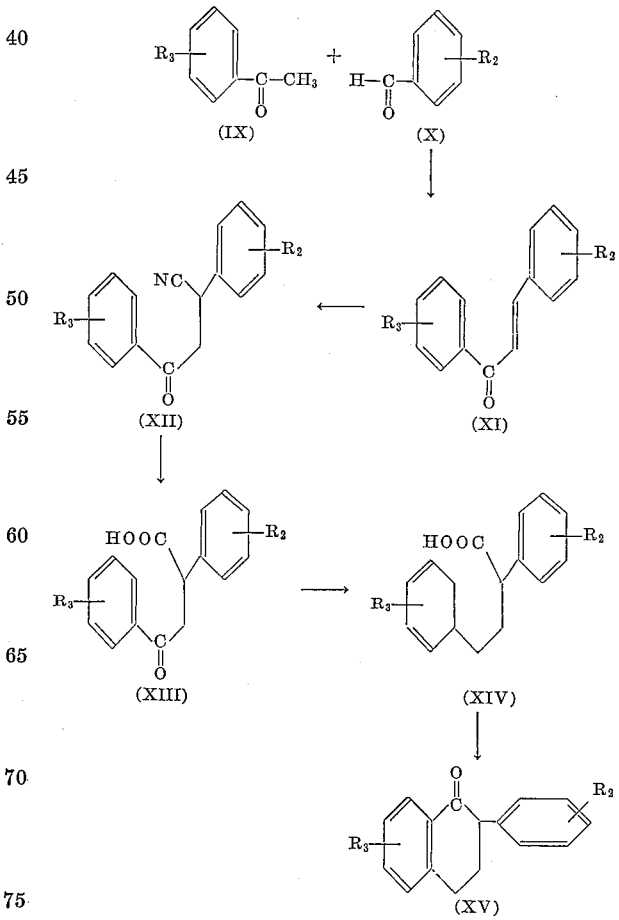

In the above reaction sequence, $R_2$ and $R_3$ have the significance hereinbefore defined with the exceptions noted above.

In the above reaction sequence, the appropriately substituted acetophenone (IX) is condensed with the appropriately substituted benzaldehyde (X) to produce the corresponding chalcone (XI) under conditions conventionally employed in the preparation of chalcones, for example, by condensation of (IX) and (X) in the presence of a base such as sodium hydroxide, potassium hydroxide, and the like, in an inert solvent such as a mixture of water and a lower alkanol, for example, methanol, ethanol, and the like. The reaction is generally conducted at or below room temperature with external cooling as required. The chalcone (XI) is isolated from the reaction mixture and purified by conventional procedures, for example, by solvent extraction followed by distillation, in the case of a liquid product, or recrystallization in the case of a solid product.

The chalcone (XI) so obtained is then converted to the corresponding nitrile (XII) by reaction with hydrogen cyanide, for example, by treatment with an alkali metal cyanide such as potassium cyanide, sodium cyanide, and the like, in the presence of acetic acid and an inert solvent such as aqueous methanol, aqueous ethanol, and the like, using the procedure described by Newman, J. Am. Chem. Soc. 60, 2947, 1938 for the conversion of benzalacetophenone (chalcone) to α-phenyl-β-benzoylpropionitrile. The desired nitrile (XII) generally separates from the reaction mixture as a solid and can be isolated by filtration and purified by recrystallization.

The nitrile (XII) so obtained is hydrolyzed to the corresponding keto acid (XIII) by conventional procedures for the hydrolysis of nitriles, for example, by heating under reflux in the presence of aqueous mineral acid such as sulfuric acid until hydrolysis is substantially complete. The desired acid (XIII) generally separates from the reaction mixture as a solid and is isolated by filtration and purified by recrystallization or by other conventional procedures, for example, by conversion to an alkali metal salt followed by acidification of the latter to regenerate the free acid.

The keto acid (XIII) so obtained is then subjected to reduction to form the corresponding acid (XIV). The reduction can be effected using any of the methods customarily employed for the conversion of a keto group to a methylene group. A particularly suitable reducing agent is amalgamated zinc and treatment of the keto acid (XIII) with amalgamated zinc in the presence of a mineral acid affords the desired acid (XIV) in excellent yield. The acid (XIV) can be isolated from the reaction mixture by conventional procedures, for example, by decantation of the liquid reaction mixture, followed by solvent extraction of the decanted liquid and evaporation of the solvent. Generally speaking, the acid (XIV) so obtained is sufficiently pure to be used in the next step of the synthesis without further treatment. If desired, however, the acid (XIV) so obtained can be purified by conventional procedures, for example, by distillation in the case of a liquid or recrystallization in the case of a solid or by conversion to an alkali metal salt followed by acidification of the latter to yield the free acid.

In the final stage of the synthesis the acid (XIV) is cyclized to the required α-tetralone (XV) in the presence of a Lewis acid, as defined above, using the general procedure described by Fieser and Hershberg, supra. The preferred Lewis acid for use in the above process is hydrogen fluoride.

A particularly convenient method of cyclizing the acid (XIV) according to the above procedure comprises adding the acid (XIV) to liquid hydrogen fluoride with stirring and then allowing the hydrogen fluoride to evaporate at about 20–30° C. The desired α-tetralone (XV) is then isolated from the residue by conventional methods, for example, by dissolving the residue in a suitable solvent such as ether, washing the solution so obtained with an aqueous solution of a base such as sodium carbonate, sodium hydroxide, and the like, and then evaporating the washed solution to dryness. The α-tetralone (XV) so obtained can be purified, if desired, by conventional procedures, for example, by recrystallization.

Alternatively, the acid (XIV) can be cyclized to the α-tetralone (XV) by conversion of the acid (XIV) to the corresponding acid chloride and treatment of the latter with aluminum chloride or stannic chloride according to the procedure described by Fieser et al., J. Am. Chem. Soc. 60, 170, 1938.

The α-tetralones (XV) wherein $R_3$ represents hydroxy can be prepared conveniently by dealkylation of the corresponding compounds of formula (XV) wherein $R_3$ represents alkoxy. The dealkylation can be effected using conventional methods, for example, by heating with aluminum chloride or bromide in the presence of an inert solvent such as benzene, xylene, and the like.

The α-tetralones of Formula (XV) wherein $R_2$ and/or $R_3$ represents alkenyloxy can be prepared conveniently by alkenylation of the corresponding compounds wherein $R_2$ and/or $R_3$ represents hydroxy. The alkenylation can be effected using conventional procedures, for example, by reacting the free hydroxy compound with the appropriate alkenyl halide in the presence of a base such as potassium carbonate, sodium methoxide, and the like.

The acetophenones (IX) which are employed as starting materials in the above-described synthesis of the α-tetralones (XV) can be prepared from the corresponding nuclear-substituted benzoic acids by conversion of the latter to the acid chlorides followed by reaction of the latter with dimethyl cadmium according to the procedure described in Chemical Reviews 40, 15, 1947. Many of the acetophenones (IX) are known in the literature.

The benzaldehydes (X) which are employed as starting materials in the above-described synthesis of the α-tetralones (XV) can be obtained by reduction of the corresponding substituted benzoyl chlorides using lithium tri-t-butoxyaluminum hydride using the procedure described by Brown et al., J. Am. Chem. Soc. 80, 5377, 1958. Many of the benzaldehydes of the formula (X) are known in the literature.

An alternative method for the preparation of the α-tetralones of Formula XV is that described by Newman, J. Am. Chem. Soc. 62, 2295, 1940. The method comprises reacting the appropriately substituted benzyl cyanide

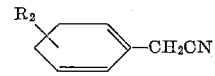

with the appropriately substituted phenethyl bromide

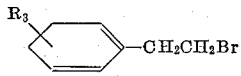

$R_2$ and $R_3$ having the significance hereinbefore defined, in the presence of sodamide and hydrolyzing the resulting nitrile to give the corresponding acid (XIV) which is then cyclized as hereinbefore described to the α-tetralone (XV).

The acid addition salts of those compounds of the invention having the Formulas I and IV which contain a tertiary amino group can be prepared by methods well known in the art. For example, the acid addition salts of the invention can be prepared by reacting the free base with a pharmacologically acceptable acid as hereinbefore defined, in the presence of an inert solvent such as water, ether, and lower alkanols such as methanol, ethanol, and the like.

The quaternary ammonium salts of those compounds of the invention I and IV which contain a tertiary amino group can be prepared by reacting the free base of the Formula I or IV with a quaternating agent, for example, an alkyl halide such as methyl iodide, ethyl chloride, isopropyl bromide, and the like, an alkenyl halide such as allyl chloride, allyl bromide, and the like, a dialkyl sulfate such as dimethyl sulfate, diethyl sulfate, and the like, an aralkyl halide such as benzhydryl chloride, benzyl chloride, phenethyl bromide, and the like, or an alkyl arylsulfonate such as methyl p-toluenesulfonate, and the like. Preferably the reaction is effected by heating the reactants together in the presence of an inert solvent such as acetonitrile, acetone, methanol, ethanol, and the like. Generally speaking, the desired quaternary salt separates from solution upon cooling the reaction mixture and can be isolated by filtration. Purification of the quaternary salt can be effected by conventional methods, for example, by recrystallization.

The anion of the quaternary ammonium salt obtained as described above can be exchanged for any other desired anion, e.g., the anions of the various acids enumerated previously by conventional procedures. For example, any of the quaternary ammonium salts of the invention can be converted to the corresponding quaternary ammonium hydroxide, illustratively by treatment with silver oxide, and the hydroxide so obtained is reacted with the appropriate acid to obtain the desired quartenary ammonium salt.

The following preparations and examples illustrate the best method contemplated by the inventor for carrying out his invention.

PREPARATION 1

*3'-methoxychalcone*

A solution of 45 g. of m-methoxyacetophenone in 75 ml. of 95% ethanol was added to a cooled solution of 16 g. of sodium hydroxide in 140 ml. of water. The mixture was then placed in an ice bath and 31.8 g. of benzaldehyde was added at such a rate as to keep the temperature below 20° C. The mixture was stirred for an additional 30 minutes in the cold and was then stirred for 27 hours at about 25° C. The resulting solution was extracted with ether and the extract was washed with saturated sodium chloride solution before being percolated through anhydrous magnesium sulfate and evaporated to dryness under reduced pressure. There was thus obtained 50.9 g. of 3'-methoxychalcone in the form of an oil having a boiling point of 180 to 185° C. at a pressure of 4 mm. of mercury.

Using the above procedure, but replacing m-methoxyacetophenone by the following known compounds: 4'-amylacetophenone, 3'-bromoacetophenone, 4'-chloroacetophenone, 4' - chloro-3'-ethylacetophenone, 5'-chloro-2'-methoxyacetophenone, 4'-ethylacetophenone, 2'-fluoroacetophenone, 3'-allyl-4'-methoxyacetophenone, 4'-methylmercaptoacetophenone, and 3' - trifluoromethylacetophenone, there are obtained 4'-amylchalcone, 3'-bromochalcone, 4'-chlorochalcone, 4'-chloro - 3' - ethylchalcone, 5'-chloro-2'-methoxychalcone, 4' - ethylchalcone, 2' - fluorochalcone, 3'-allyl-4'-methoxychalcone, 4'-methylmercaptochalcone, and 3'-trifluoromethylchalcone, respectively.

Similarly, using the procedure described in Preparation 1, but replacing benzaldehyde by the following known compounds: 2-bromobenzaldehyde, 3-chlorobenzaldehyde, 4-dimethylaminobenzaldehyde, 2-chloro-6-fluorobenzaldehyde, 2,3-dichlorobenzaldehyde, p-tolualdehyde, 2,6-dimethylbenzaldehyde, 4-methylmercaptobenzaldehyde, 4-allylbenzaldehyde, and 4 - trifluoromethylbenzaldehyde, there are obtained 2-bromochalcone, 3-chlorochalcone, 4-dimethylaminochalcone, 2-chloro-6-fluorochalcone, 2,3-dichlorochalcone, 4-methylchalcone, 2,6-dimethylchalcone, 4-methylmercaptochalcone, 4-allylchalcone, and 4-trifluoromethylchalcone, respectively.

PREPARATION 2

*2-phenyl-4-(3-methoxyphenyl)-4-ketobutyronitrile*

A solution of 27.8 g. of potassium cyanide in 50 ml. of water was added to a mixture of 50.9 g. of 3'-methoxychalcone, 13.0 g. of acetic acid, and 100 ml. of 95% ethanol over a period of 10 minutes. The temperature was maintained at 45° C. The turbid mixture was then stirred for 6 hours and allowed to stand overnight in the cold. The crystalline solid which had separated was isolated by filtration, washed with ice-cold aqueous ethanol and with water, and recrystallized from ethanol. There was thus obtained 49.22 g. of 2-phenyl-4-(3-methoxyphenyl)-4-ketobutyronitrile in the form of a crystalline solid having a melting point of 96 to 101° C. The infrared spectrum of the compound (mineral oil mull) exhibited maxima at 2200, 1660, and 1580 reciprocal centimeters.

Using the above procedure, but replacing 3'-methoxychalcone by 4'-amylchalcone, 3'-bromochalcone, 4'-chlorochalcone, 4' - chloro-3'-ethylchalcone, 5'-chloro-2'-methoxychalcone, 4'-ethylchalcone, 2'-fluorochalcone, 3'-allyl-4'-methoxychalcone, 4'-methylmercaptochalcone, 3'-trifluoromethylchalcone, 2-bromochalcone, 3-chlorochalcone, 4-dimethylaminochalcone, 2 - chloro-6-fluorochalcone, 2,3-dichlorochalcone, 4-methylchalcone, 2,6-dimethylchalcone, 4 - methylmercaptochalcone, 4-allylchalcone, and 4-trifluoromethylchalcone, there are obtained 2-phenyl-4-(4-amylphenyl)-4-ketobutyronitrile,
2-phenyl-4-(3-bromophenyl)-4-ketobutyronitrile,
2-phenyl-4-(4-chlorophenyl)-4-ketobutyronitrile,
2-phenyl-4-(4-chloro-3-ethylphenyl)-4-ketobutyronitrile,
2-phenyl-4-(5-chloro-2-methoxyphenyl)-4-ketobutyronitrile,
2-phenyl-4-(4-ethylphenyl)-4-ketobutyronitrile,
2-phenyl-4-(2-fluorophenyl)-4-ketobutyronitrile,
2-phenyl-4-(3-allyl-4-methoxyphenyl)-4-ketobutyronitrile,
2-phenyl-4-(4-methmercaptophenyl)-4-ketobutyronitrile,
2-phenyl-4-(3-trifluoromethylphenyl)-4-ketobutyronitrile,
2-(2-bromophenyl)-4-phenyl-4-ketobutyronitrile,
2-(3-chlorophenyl)-4-phenyl-4-ketobutyronitrile,
2-(4-dimethylaminophenyl)-4-phenyl-4-ketobutyronitrile,
2-(2-chloro-6-fluorophenyl)-4-phenyl-4-ketobutyronitrile,
2-(2,3-dichlorophenyl)-4-phenyl-4-ketobutyronitrile,
2-p-tolyl-4-phenyl-4-ketobutyronitrile,
2-(2,6-dimethylphenyl)-4-phenyl-4-ketobutyronitrile,
2-(4-methylmercaptophenyl)-4-phenyl-4-ketobutyronitrile,
2-(4-allylphenyl)-4-phenyl-4-ketobutyronitrile, and
2-(4-trifluoromethylphenyl)-4-phenyl-4-ketobutyronitrile, respectively.

PREPARATION 3

*2-phenyl-4-(3-methoxyphenyl)-4-ketobutyric acid*

A suspension of 49.22 g. of 2-phenyl-4-(3-methoxyphenyl)-4-ketobutyronitrile in a mixture of 140 ml. of concentrated sulfuric acid and 125 ml. of water was heated on a steam bath with vigorous stirring for 4 hours. The resulting mixture was cooled and diluted with ice-water. The solid which separated was isolated by filtration and recrystallized from aqueous ethanol and then from benzene. There was thus obtained 29.5 g. of 2-phenyl-4-(3-methoxyphenyl)-4-ketobutyric acid in the form of a crystalline solid having a melting point of 140 to 145° C. An analytical sample having a melting point of 143 to 145° C. was obtained by recrystallization from benzene.

*Analysis.*—Calcd. for $C_{17}H_{16}O_4$: C, 71.82; H, 5.67. Found: C, 72.10; H, 5.74.

Using the above procedure, but replacing 2-phenyl-4-(3-methoxyphenyl)-4-ketobutyronitrile by the appropriately substituted 2,4 - diphenyl-4-ketobutyrontrile (prepared as described in Preparation 2), there are obtained 2-phenyl-4-(4-amylphenyl)-4-ketobutyric acid,
2-phenyl-4-(3-bromophenyl)-4-ketobutyric acid, 2-phenyl-4-(4-chlorophenyl)-4-ketobutyric acid,
2-phenyl-4-(4-chloro-3-ethylphenyl)-4-ketobutyric acid,
2-phenyl-4-(5-chloro-2-methoxyphenyl)-4-ketobutyric acid,
2-phenyl-4-(4-ethylphenyl)-4-ketobutyric acid,
2-phenyl-4-(2-fluorophenyl)-4-ketobutyric acid,
2-phenyl-4-(3-allyl-4-methoxyphenyl)-4-ketobutyric acid,
2-phenyl-4-(4-methylmercaptophenyl)-4-ketobutyric acid,
2-phenyl-4-(3-trifluoromethylphenyl)-4-ketobutyric acid,
2-(2-bromophenyl)-4-phenyl-4-ketobutyric acid,
2-(3-chlorophenyl)-4-phenyl-4-ketobutyric acid,
2-(4-dimethylaminophenyl)-4-phenyl-4-ketobutyric acid,
2-(2-chloro-6-fluorophenyl)-4-phenyl-4-ketobutyric acid,
2-(2,3-dichlorophenyl)-4-phenyl-4-ketobutyric acid,
2-p-tolyl-4-phenyl-4-ketobutyric acid,
2-(2,6-dimethylphenyl)-4-phenyl-4-ketobutyric acid,
2-(4-methylmeracptophenyl)-4-phenyl-4-ketobutyric acid,
2-(4-allylphenyl)-4-phenyl-4-ketobutyric acid, and
2-(4-trifluoromethylphenyl)-4-phenyl-4-ketobutyric acid, respectively.

PREPARATION 4

2-phenyl-4-(3-methoxyphenyl)butyric acid

A total of 300 g. of mossy zinc was washed briefly with 2.5 N hydrochloric acid and then with water. The metal was covered with a solution of 6.7 g. of mercuric chloride in 500 ml. of water, and this mixture was allowed to stand for 30 minutes with occasional shaking. The liquid phase was decanted and the amalgamated metal was washed well with water. To the amalgamated zinc so produced was added a mixture of 29.3 g. of 2-phenyl-4-(3-methoxyphenyl)-4-ketobutyric acid and 400 ml. of hydrochloric acid. The mixture was heated cautiously to reflux temperature and then heated under reflux for a total of 20 hours, additional portions of hydrochloric acid being added after 5 hours and 10 hours of heating. The resulting mixture was cooled and the liquid was decanted from the solid. The solid residue was washed well with ether and the decanted liquid was extracted with ether. The ether extract and washings were combined and washed with water and then with saturated sodium chloride solution before being percolated through anhydrous magnesium sulfate. The percolate was evaporated to dryness. There was thus obtained 26.2 g. of 2-phenyl-4-(3-methoxyphenyl) butyric acid in the form of a viscous oil which was employed without further purification in the process of Preparation 5. The infrared spectrum of the compound (mineral oil mull) exhibited a maximum of 1705 reciprocal centimeters.

Using the above procedure, but replacing the 2-phenyl-4-(3-methoxyphenyl)-4-ketobutyric acid by the appropriately substituted 2,4-diphenyl-4-ketobutyric acid (prepared as described in Preparation 3), there are obtained 2-phenyl-4 - (4-amylphenyl)-, 2-phenyl-4-(3-bromophenyl)-, 2-phenyl-4-(4-chlorophenyl)-, 2-phenyl-4-(4-chloro-3-ethylphenyl)-, 2-phenyl-4-(5-chloro-2-methoxyphenyl)-, 2-phenyl-4-(4-ethylphenyl)-, 2-phenyl-4 - (2-fluorophenyl)-, 2-phenyl-4-(3-allyl-4-methoxyphenyl)-, 2-phenyl-4-(4-methylmercaptophenyl)-, 2-phenyl-4-(3-trifluoromethylphenyl)-, 2-(2-bromophenyl) - 4-phenyl-, 2-(3-chlorophenyl)-4-phenyl-, 2-(4-dimethylaminophenyl)-4-phenyl-, 2-(2-chloro-6-fluorophenyl) - 4-phenyl-, 2-(2,3-dichlorophenyl)-4-phenyl-, 2-p-tolyl-4-phenyl-, 2-(2,6-dimethylphenyl)-4-phenyl-, 2-(4-methylmercaptophenyl)-4-phenyl-, 2-(4-allylphenyl)-4-phenyl-, and 2-(4-trifluoromethylphenyl)-4-phenylbutyric acids, respectively.

PREPARATION 5

2-phenyl-6-methoxy-1,2,3,4-tetrahydro-1-naphthalenone

A total of 150 ml. of liquid hydrogen fluoride was added to 26.2 g. of 2-phenyl-4-(3-methoxyphenyl)butyric acid with cooling and swirling. The resulting mixture was allowed to stand at room temperature for 3 days. The residue was dissolved in methylene chloride and the solution was poured into excess concentrated aqueous potassium carbonate solution. The organic layer was separated, washed with water and saturated sodium chloride solution, and then evaporated to dryness. The residue was dissolved in 2 l. of mixed hexanes (Skellysolve B) containing 7.5% by volume of acetone and the solution was passed through a column of magnesium silicate (Florisil) prewashed with the same solvent mixture. The eluate was evaporated to dryness and the residue (17.0 g.) was recrystallized twice from cyclohexane. There was thus obtained 13.38 g. of 2-phenyl-6-methoxy-1,2,3,4-tetrahydro-1-naphthalenone in the form of a crystalline compound having a melting point of 113 to 116° C.

*Analysis.*—Calcd. for $C_{17}H_{16}O_2$: C, 80.92; H, 6.39. Found: C, 81.08; H, 6.35.

Using the above procedure, but replacing 2-phenyl-4-(3-methoxyphenyl)butyric acid by the appropriately substituted 2,4-diphenylbutyric acid (prepared as described in Preparation 4), there are obtained 2-phenyl-7-amyl-, 2-phenyl-6-bromo-, 2-phenyl-7-chloro-, 2-phenyl-7-chloro-6-ethyl-, 2-phenyl - 8-chloro - 5-methoxy-, 2-phenyl-7-ethyl-, 2-phenyl-5-fluoro-, 2-phenyl-6-allyl-7-methoxy-, 2-phenyl-7-methylmercapto-, 2-phenyl - 6-trifluoromethyl-, 2-(2-bromophenyl)-, 2-(3-chlorophenyl)-, 2-(4-dimethylaminophenyl)-, 2-(2-chloro-6-fluorophenyl)-, 2-(2,3-dichlorophenyl)-, 2-p-tolyl-, 2-(2,6-dimethylphenyl)-, 2-(4-methylmercaptophenyl)-, 2-(4-allylphenyl)-, and 2-(4-trifluoromethylphenyl) - 1,2,3,4 - tetrahydro-1-naphthalenones, respectively.

PREPARATION 6

2-(p-fluorophenyl)-1-indanone

A solution of 36.1 g. (0.235 mole) of p-fluorophenylacetic acid in 500 ml. of ether was added to a solution of potassium amide prepared from 20.4 g. (0.52 mole) of potassium in 750 ml. of liquid ammonia. To the resulting mixture was added slowly, with stirring, over a period of 10 minutes, a solution of 33.0 g. (0.26 mole) of benzyl chloride in 60 ml. of ether. The mixture was stirred for a further 30 minutes, at the end of which time an additional 3 ml. (0.003 mole) of benzyl chloride was added and the liquid ammonia was then allowed to evaporate. The residue was dissolved in water and the aqueous solution so obtained was extracted with ether and then filtered through diatomaceous earth (Celite). The filtrate was acidified by the addition of concentrated hydrochloric acid and the solid which separated was isolated by filtration and recrystallized from a mixture of chloroform and hexane. There was thus obtained α-benzyl-p-fluorophenylacetic acid in the form of a crystalline solid.

The acid so obtained was added portionwise to 300 ml. of well stirred liquid hydrogen fluoride. The hydrogen fluoride was then allowed to evaporate at room temperature and the residue was dissolved in ether. The ethereal solution was washed successively with water, aqueous sodium bicarbonate solution, aqueous 0.5 N sodium hydroxide solution, and finally with saturated sodium chloride solution. The washed ethereal solution was dried over anhydrous sodium sulfate, filtered, and the filtrate was evaporated to dryness. The residual oily solid was dissolved in benzene and chromatographed over a column of magnesium silicate (Florisil). The column was eluted with Skellysolve B containing 5% by volume of acetone. The major crystalline fraction was recrystallized from aqueous methanol. There was thus obtained 2-(p-fluorophenyl)-1-indanone in the form of a crystalline solid.

Using the procedure described in Preparation 6, but replacing p-fluorophenylacetic acid by p-tolylacetic acid, p-chlorophenylacetic acid, m-trifluoromethylphenylacetic acid, p-methylmercaptophenylacetic acid, and 3-allylphenylacetic acid, there are obtained 2-(p-tolyl)-1-indanone, 2-(p-chlorophenyl)-1-indanone, 2-(m-trifluoromethylphenyl) - 1 - indanone, 2-(p-methylmercaptophenyl)-1-indanone, and 2-(3-allylphenyl)-1-indanone, respectively.

Similarly, using the procedure described in Preparation 6, but replacing benzyl chloride by m-methoxybenzyl chloride, p-trifluoromethylbenzyl chloride, and p-(1,3-dimethylbutyl)benzyl chloride, there are obtained 2-(p-fluorophenyl)-5-methoxy-1-indanone, 2-(p-fluorophenyl)-6-trifluoromethyl - 1 - indanone, and 2-(p-fluorophenyl)-6-(1,3-dimethylbutyl)-1-indanone, respectively.

PREPARATION 7

*p-(3-pyrrolidinopropyl)bromobenzene*

A total of 42 ml. of bromine was added dropwise with stirring to a suspension of 90 g. of hydrocinnamic acid in 600 ml. of water over a period of 30 minutes. An additional 500 ml. of water was then added and the mixture was heated on the steam bath for 10 minutes. The resulting mixture was allowed to cool and the solid which separated was isolated by filtration. The solid so obtained was recrystallized twice from aqueous ethanol and then from aqueous acetone to yield 47.74 g. of p-bromohydrocinnamic acid in the form of a crystalline solid having a melting point of 127 to 133° C.

A solution of the acid so obtained in a mixture of 50 ml. of thionyl chloride and 500 ml. of benzene was heated under reflux for 5 hours. The resulting mixture was allowed to stand for 17 hours at room temperature before removing the solvent by distillation under reduced pressure. The crude acid chloride so obtained was dissolved in 200 ml. of benzene and added slowly with stirring over a period of 15 minutes to a solution of 82 ml. of pyrrolidine in 200 ml. of benzene. The resulting mixture was stirred for 3 hours at room temperature before evaporating to dryness under reduced pressure. The residue was dissolved in ether and water and the organic layer was separated. The organic layer was washed successively with water, 2.5 N hydrochloric acid, and saturated sodium chloride solution before being evaporated to dryness. The residue was recrystallized from cyclohexane to give 37.91 g. of 1-(p-bromohydrocinnamoyl) pyrrolidine in the form of a crystalline solid having a melting point of 59 to 65° C. An analytical sample was prepared by recrystallization from ligroin.

*Analysis.*—Calcd. for C₁₃H₁₆BrNO: C, 55.33; H, 5.72; Br, 28.32. Found: C, 55.43; H, 5.78; Br, 29.50.

A solution of 37.41 g. of the above amide in ether was added to a well-stirred suspension of 10 g. of lithium aluminum hydride in ether at a rate sufficient to produce gentle refluxing. After the addition was complete the mixture was refluxed for a further 17 hours before being cooled in ice and treated in turn with 10 ml. of water, 10 ml. of 20% aqueous potassium hydroxide and then 30 ml. of water. The resulting mixture was filtered and the solid on the filter was washed well with ether. The combined filtrate and washings were washed well with water before being evaporated to dryness. The residual oil was distilled under reduced pressure. There was thus obtained 26.83 g. of p-(3-pyrrolidinopropyl)bromobenzene in the form of an oil having a boiling point of 135 to 139.5° C./5 mm.

*Analysis.*—Calcd. for C₁₃H₁₈BrN: C, 58.21; H, 6.76; Br, 29.80. Found: C, 59.31; H, 7.02; Br, 29.80.

Using the above procedure, but replacing hydrocinnamic acid by phenylacetic acid, 2-phenylpropionic acid, 4-phenylbutyric acid and 5-phenylvaleric acid, there are obtained p-(2-pyrrolidinoethyl)bromobenzene, p-(2-pyrrolidinol-1-methylethyl)bromobenzene, p-(4 - pyrrolidinobutyl)bromobenzene and p-(5-pyrrolidinopentyl)bromobenzene, respectively.

Similarly, using the procedure described in Preparation 7, but replacing pyrrolidine by dimethylamine, diethylamine, diisopropylamine, dihexylamine, morpholine, piperidine, and piperazine, there are obtained p-(3-dimethylaminopropyl)-, p-(3-diethylaminopropyl)-, p-(3-diisopropylaminopropyl)-, p-(3-dihexylaminopropyl)-, p-(3-morpholinopropyl)-, p-(3-piperidinopropyl)-, and p-(3-piperazinopropyl)bromobenzenes.

PREPARATION 8

*p-(pyrrolidinomethyl)bromobenzene*

A mixture of 30 g. of p-bromobenzoic acid, 60 ml. of thionylchloride and 60 ml. of benzene was heated under reflux for 4 hours. The solvent and excess reagent were removed under reduced pressure. The residual oil was dissolved in 100 ml. of benzene and added over a period of 30 minutes to 35 ml. of pyrrolidine in 10 ml. of benzene. The mixture so obtained was stirred for 2 hours before being washed successively with water, 2.5 N hydrochloric acid and saturated aqueous sodium chloride solution. The washed solution was evaporated to dryness and the residue was recrystallized from petroleum ether. There was thus obtained 33.71 g. of 1-(p-bromobenzoyl)pyrrolidine in the form of a crystalline solid having a melting point of 77 to 79° C.

*Analysis.*—Calcd. for C₁₁H₁₂BrNO: C, 51.98; H, 4.76; Br, 31.45 Found: C, 52.12; H, 4.63; Br, 31.64.

A solution of 33.71 g. of 1-(p-bromobenzoyl)pyrrolidine in 400 ml. of ether was added to a well stirred suspension of 10 g. of lithium aluminum hydride in ether over a period of 1.5 hr. The resulting mixture was heated under reflux for 3 hr. and then were added, in turn, 10 ml. of water, 10 ml. of 15% aqueous sodium hydroxide solution and 30 ml. of water. The solid which separated was isolated by filtration and washed well with ether on the filter. The combined filtrates were washed with water and saturated aqueous sodium chloride solution before being evaporated to dryness. The residual oil was distilled under reduced pressure. There was thus obtained 16.62 g. of p-(pyrrolidinomethyl)-bromobenzene having a boiling point of 88 to 92° C. at a pressure of 0.6 mm.

*Analysis.*—Calcd. for C₁₁H₁₄BrN: C, 55.01; H, 5.88; Br; 33.28 Found: C, 55.82; H, 5.94; Br. 33.08.

EXAMPLE 1

*1,2-diphenyl-6-methoxy-1,2,3,4-tetrahydro-1-naphthol*

A solution of 5.04 g. (0.02 mole) of 2-phenyl-6-methoxy- 1,2,3,4-tetrahydro-1-naphthalenone in 75 ml. of tetrahydrofuran was added to an ice-cooled solution of the Grignard reagent prepared from 31.4 g. (21 ml.) of bromobenzene and 4.90 g. of magnesium in 200 ml. of ether. The resulting mixture was allowed to stand at room temperature (approximately 20° C.) for 16 hours before being decomposed by the careful addition of water. The mixture so obtained was filtered and the organic filtrate was washed with water and with saturated sodium chloride solution before being dried over anhydrous sodium sulfate. The dried solution was filtered and the filtrate was evaporated to dryness. The residual gum was dissolved in methylene chloride and chromatographed twice over magnesium silicate (Florisil). The columns were eluted with petroleum ether containing increasing proportions of acetone and those fractions which on the basis of paper chromatographic analysis, were found to contain the desired product were combined and evaporated to dryness. The fractions so obtained from the second chromatography were recrystallized from aqueous methanol. There was thus obtained 2.5 g. of 1,2-diphenyl-6-methoxy-1,2,3,4,-tetrahydro-1-naphthol in the form of a crystalline solid having a melting point of 112 to 116° C. An analytical sample having a melting point of 113 to 116° C. was obtained by further recrystallization from petroleum ether.

*Analysis.*—Calcd. for $C_{23}H_{22}O_2$: C, 82.98; H, 6.96. Found: C, 83.60; H, 6.93.

EXAMPLE 2

*1-(p-tolyl)-2-phenyl-6-methoxy-1,2,3,4-tetrahydro-1-naphthol*

A solution of 5.04 g. of 2-phenyl-6-methoxy-1,2,3,4-tetrahydro-1-naphthalenone in 75 ml. of tetrahydrofuran was added to an ice-cooled solution of the Grignard reagent prepared from 34.4 g. of p-bromotoluene and 4.90 g. of magnesium in 200 ml. of ether. The resulting mixture was allowed to stand for 16 hours at room temperature before being decomposed by the addition of water. The mixture so obtained was filtered and the organic filtrate was washed with water and with saturated sodium chloride solution before being dried over anhydrous sodium sulfate. The dried solution was filtered and the filtrate was evaporated to dryness. The residual gum was dissolved in methylene chloride and chromatographed over magnesium silicate (Florisil). The column was eluted with petroleum ether containing increasing proportions of acetone and those fractions which, on the basis of paper chromatographic analysis, were found to contain the desired material were combined and evaporated to dryness. The residue was recrystallized from aqueous methanol. There was thus obtained 3.10 g. of 1-(p-tolyl)-2-phenyl-6-methoxy-1,2,3,4-tetrahydro-1-naphthol in the form of a crystalline solid having a melting point of 103 to 108° C. An analytical sample having a melting point of 108 to 111° C. was obtained by further recrystallization from Skellysolve B.

*Analysis.*—Calcd. for $C_{14}H_{24}O_2$: C, 83.69; H. 7.02. Found: C, 83.67; H, 7.12.

EXAMPLE 3

*1-(p-fluorophenyl)-2-phenyl-6-methoxy-1,2,3,4-tetrahydro-1-naphthol*

To an ice-cold solution of the Grignard reagent prepared from 17.5 g. of p-bromofluorobenzene and 2.43 g. of magnesium in 200 ml. of ether there was added a solution of 5.0 g. of 2-phenyl-6-methoxy-1,2,3,4-tetrahydro-1-naphthalenone in 75 ml. of tetrahydrofuran. The resulting mixture was allowed to stand for 16 hours before being decomposed by the addition of water. The mixture so obtained was filtered and the organic filtrate was washed with water and with saturated sodium chloride solution before being dried over anhydrous sodium sulfate. The dried solution was filtered and the filtrate was evaporated to dryness. The residual gum was dissolved in methylene chloride and chromatographed over magnesium silicate (Florisil). The column was eluted with petroleum ether containing increasing proportions of acetone and those fractions which, on the basis of paper chromatographic analysis, were found to contain the desired material were combined and evaporated to dryness. The residue was recrystallized twice from Skellysolve B. There was thus obtained 3.75 g. of 1-(p-fluorophenyl)-2-phenyl-6-methoxy-1,2,3,4-tetrahydro-1-naphthol in the form of a crystalline solid having a melting point of 130 to 132.5° C.

*Analysis.*—Calcd. for $C_{23}H_{21}FO_2$: C, 79.29; H, 6.08. Found: C, 79.65; H, 6.41.

EXAMPLE 4

*1,2-diphenyl-6-methoxy-3,4-dihydronaphthalene*

A solution of 1 g. of 1,2-diphenyl-6-methoxy-1,2,3,4-tetrahydro-1-naphthol (prepared as described in Example 1) and 0.1 g. of p-toluenesulfonic acid in 100 ml. of toluene was heated for 5 hours at reflux under a Dean-Starke water trap. The solvent was then distilled from the reaction mixture and the residue was dissolved in ether. The ethereal solution was washed with saturated aqueous sodium bicarbonate solution, then with water, and finally with saturated sodium chloride solution. The washed ether solution was evaporated to dryness and the residue was recrystallized twice from Skellysolve B. There was thus obtained 0.52 g. of 1,2-diphenyl-6-methoxy-3,4-dihydronaphthalene in the form of a crystalline solid having a melting point of 90 to 92° C.

*Analysis.*—Calcd. for $C_{23}H_{20}O$: C, 88.42; H, 6.45. Found: C, 87.99; H, 6.78.

EXAMPLE 5

*1-(p-tolyl)-2-phenyl-6-methoxy-3,4-dihydronaphthalene*

Using the procedure described in Example 4, but replacing 1,2-diphenyl-6-methoxy-1,2,3,4-tetrahydro-1-naphthol by 1-(p-tolyl)-2-phenyl-6-methoxy-1,2,3,4-tetrahydro-1-naphthol, there was obtained 1-(p-tolyl)-2-phenyl-6-methoxy-3,4-dihydronaphthalene in the form of a crystalline solid having a melting point of 100 to 103° C.

*Analysis.*—Calcd. for $C_{24}H_{22}O$: C, 88.31; H, 6.79. Found: C, 88.33; H, 7.06.

EXAMPLE 6

*1-(p-fluorophenyl)-2-phenyl-6-methoxy-3,4-dihydronaphthalene*

Using the procedure described in Example 4, but replacing 1,2-diphenyl-6-methoxy-1,2,3,4-tetrahydro-1-naphthol by 1-(p-fluorophenyl)-2-phenyl-6-methoxy-1,2,3,4-tetrahydro-1-naphthol, there was obtained 1-(p-fluorophenyl)-2-phenyl-6-methoxy-3,4-dihydronaphthalene in the form of a crystalline solid having a melting point of 99 to 101° C.

*Analysis.*—Calcd. for $C_{23}H_{19}FO$: C, 83.61; H, 5.80. Found: C, 83.82; H, 5.82.

EXAMPLE 7

*1(p-dimethylaminophenyl)-2-phenyl-6-methoxy-3,4-dihydronaphthalene and the hydrochloride thereof*

To an ice-cooled solution of the Grignard reagent prepared from 4.0 g. of p-bromo-N,N-dimethylaniline and 0.50 g. of magnesium in 40 ml. of tetrahydrofuran, there was added a solution of 5.0 g. of 2-phenyl-6-methoxy-1,2,3,4-tetrahydro-1-naphthalenone in 75 ml. of tetrahydrofuran. The resulting mixture was allowed to stand for 17 hours at room temperature before being decomposed by the careful addition of water. The mixture so obtained was filtrated and the organic filtrate was washed with water and saturated sodium chloride solution before being evaporated to dryness. The residue was dissolved in ether and the ether solution was washed with three 200-ml. portions of 2.5 N hydrochloric acid. The acid extracts were combined and the solid which separated therefrom on brief standing was collected by filtration. There was thus obtained 3.8 g. of 1-(p-dimethylaminophenyl)-2-phenyl-6-methoxy-3,4-dihydronaphthalene hydrochloride in the form of a crystalline solid having a melting point of 222 to 228° C.

The hydrochloride so obtained was dissolved in methylene chloride and the solution so obtained was washed with aqueous sodium bicarbonate solution. The washed methylene chloride solution was evaporated to dryness and the residue was recrystallized from methanol. There was thus obtained 2.77 g. of 1-(p-dimethylaminophenyl)-2-phenyl-6-methoxy-3,4-dihydronaphthalene in the form of a crystalline solid having a melting point of 130 to 133° C.

*Analysis.*—Calcd. for $C_{25}H_{25}NO$: C, 84.47; H. 7.09. Found: C, 84.63; H, 7.41.

The ultraviolet spectrum of the above compound (ethanol solution) exhibited maxima at 242 ($\epsilon=15,200$) and 270 ($\epsilon=24,400$) millimicrons.

EXAMPLE 8

*1-[p-(3-pyrrolidinopropyl)phenyl]-2-phenyl-6-methoxy-3,4-dihydronaphthalene and the hydrochloride and hydriodide thereof*

A solution of 5 g. of 2-phenyl-6-methoxy-1,2,3,4-tetrahydro-1-naphthalenone in 75 ml. of tetrahydrofuran was added to an ice-cooled solution of the Grignard reagent prepared from 5.36 g. of p-(3-pyrrolidinopropyl)bromobenzene and 0.5 g. of magnesium in 50 ml. of tetrahydrofuran. The resulting mixture was allowed to stand for 17 hours at room temperature before being decomposed by the careful addition of water. The mixture so obtained was filtered and the organic filtrate was washed with water and saturated sodium chloride solution before being evaporated to dryness. The residue was dissolved in ether and the ether solution was washed with three 200-ml. portions of 2.5 N hydrochloric acid. The acid extracts were combined and the solid which separated therefrom on brief standing was collected by filtration. There was thus obtained 1-[p-(3-pyrrolidinopropyl)phenyl]-2-phenyl-6-methoxy-3,4-dihydronaphthalene hydrochloride in the form of a crystalline solid.

The hydrochloride so obtained was dissolved in methylene chloride and the solution so obtained was washed with aqueous sodium bicarbonate solution. The washed methylene chloride solution was evaporated to dryness to yield 1-[p-3 - pyrrolidinopropyl)phenyl] - 2 - phenyl-6-methoxy-3,4-dihydronaphthalene in the form of a gum. The latter was dissolved in methylene chloride and chromatographed on a column of magnesium silicate (Florisil). The column was eluted with petroleum ether containing increasing proportions of acetone and those fractions which, on the basis of paper chromatographic analysis, were found to contain the desired meaterial were combined and evaporated to dryness. The oil so obtained was dissolved in methylene chloride and washed with 20% aqueous hydriodic acid. The methylene chloride solution was evaporated to dryness and the solid residue was recrystallized three times from a mixture of methylene chloride and ethyl acetate. There was thus obtained 0.76 g. of 1-[p-3-pyrrolidinopropyl)phenyl-2-phenyl-6-methoxy-3,4-dihydronaphthalene hydriodide in the form of its ethyl acetate solvate having a melting point of 114 to 117° C. (with decomposition).

*Analysis.*—Calcd. for $C_{30}H_{34}INO \cdot C_4H_8O_2$: C, 64.07; H, 6.32. Found: C, 63.59; H, 6.51.

EXAMPLE 9

*1-[p-(3-dimethylaminopropyl)phenyl] - 2phenyl - 6-methoxy-3,4-dihydronaphthalene and the hydrochloride thereof*

Using the procedure described in Example 8, but replacing the Grignard reagent from p-(3-pyrrolidinopropyl)bromobenzene by that from p-(3-dimethylaminopropyl)bromobenzene, there are obtained 1-[p-(3-dimethylaminopropyl)phenyl]-2-phenyl - 6 - methoxy-3,4-dihydronaphthalene and the hydrochloride thereof.

Similarly, using the procedure of Example 8, but using the Grignard reagents prepared from p-(3-diethylaminopropyl)-, p-(3-diisopropylaminopropyl)-, p-(3-dihexylaminopropyl)-, p-(3-morpholinopropyl)-, p-(3-piperidinopropyl)-, p-(3-piperazinopropyl)-, p-(2-pyrrolidinoethyl)-, p-(2-pyrrolidino-1-methylethyl)-, p-(4-pyrrolidinobutyl)-, and p-(5-pyrrolidinopentyl)bromobenzenes, there are obtained:

1-[p-(3-diethylaminopropyl)phenyl]-,
1-[p-(3-diisopropylaminopropyl)phenyl]-,
1-[p-(3-dihexylaminopropyl)phenyl]-,
1-[p-(3-morpholinopropyl)phenyl]-,
1-[p-(3-piperidinopropyl)phenyl]-,
1-[p-(3-piperazinopropyl)phenyl]-,
1-[p-(2-pyrrolidinoethyl)phenyl]-,
1-[p-(2-pyrrolidino-1-methylethyl)phenyl]-,
1-[p-(4-pyrrolidinobutyl)phenyl]-, and
1-[p-(5-pyrrolidinopentyl)phenyl] - 2-phenyl-6-methoxy-3,4-dihydronaphthalenes and the hydrochlorides thereof.

EXAMPLE 10

*1,2-diphenyl-5-fluoro-1,2,3,4-tetrahydro-1-naphthol*

Using the procedure described in Example 1, but replacing 2-phenyl-6-methoxy - 1,2,3,4-tetrahydro-1-naphthalenone by 2-phenyl-5-fluoro-1,2,3,4-tetrahydro-1-naphthalenone, there is obtained 1,2-diphenyl-5-fluoro-1,2,3,4 tetrahydro-1-naphthol.

Similarly, using the procedure described in Example 1, but replacing 2-phenyl-6-methoxy-1,2,3,4-tetrahydro-1-naphthalenone by:

2-phenyl-7-amyl-,
2-phenyl-6-bromo-,
2-phenyl-7-chloro-,
2-phenyl-7-chloro-6-ethyl-,
2-phenyl-8-chloro-5-methoxy-,
2-phenyl-7-ethyl-,
2-phenyl-6-allyl-7-methoxy-,
2-phenyl-7-methylmercapto-,
2-phenyl-6-trifluoromethyl-,
2-(2-bromophenyl)-,
2-(3-chlorophenyl)-,
2-(4-dimethylaminophenyl)-,
2-(2-chloro-6-fluorophenyl)-,
2-(2,3-dichlorophenyl)-,
2-p-tolyl-,
2-(2,6-dimethylphenyl)-,
2-(4-methylmercaptophenyl)-, and
2-(4-trifluoromethylphenyl)-1,2,3,4-tetrahydro-1-naphthalenone, there are obtained:
1,2-diphenyl-7-amyl-,
1,2-diphenyl-6-bromo-,
1,2-diphenyl-7-chloro-,
1,2-diphenyl-7-chloro-6-ethyl-,
1,2-diphenyl-8-chloro-5-methoxy-,
1,2-diphenyl-7-ethyl-,
1,2-diphenyl-6-allyl-7-methoxy-,
1,2-diphenyl-7-methylmercapto-,
1,2-diphenyl-6-trifluoromethyl-,
1-phenyl-2-(2-bromophenyl)-,
1-phenyl-2-(3-chlorophenyl)-,
1-phenyl-2-(4-dimethylaminophenyl)-,
1-phenyl-2-(2-chloro-6-fluorophenyl)-,
1-phenyl-2-(2,3-dichlorophenyl)-,
1-phenyl-2-p-tolyl-,
1-phenyl-2-(2,6-dimethylphenyl)-,
1-phenyl-2-(4-methylmercaptophenyl)-, and
1-phenyl-2-(4-trifluoromethylphenyl) - 1,2,3,4-tetrahydro-1-naphthalenone, respectively.

EXAMPLE 11

*1,2 - diphenyl - 5 - fluoro - 3,4 - dihydronaphthalene*

Using the procedure described in Example 4, but replacing 1,2-diphenyl-6-methoxy-1,2,3,4-tetrahydro-1-naphthol by 1,2 - diphenyl - 5-fluoro-1,2,3,4-tetrahydro-1-naphthol, there is obtained 1,2-diphenyl-5-fluoro-3,4-dihydronaphthalene.

Similarly, using the procedure described in Example 4, but replacing 1,2-diphenyl-6-methoxy-1,2,3,4-tetrahydro-1-naphthol by the appropriately substituted 1,2,3,4-tetrahydro-1-naphthols, there are obtained the corresponding 3,4-dihydronaphthalenes such as:
1,2-diphenyl-7-amyl-,
1,2-diphenyl-6-bromo-,
1,2-diphenyl-7-chloro-,
1,2-diphenyl-7-chloro-6-ethyl-,
1,2-diphenyl-8-chloro-5-methoxy-,
1,2-diphenyl-7-ethyl-,
1,2-diphenyl-6-allyl-7-methoxy-,
1,2-diphenyl-7-methylmercapto-,
1,2-diphenyl-6-trifluoromethyl-,
1-phenyl-2-(2-bromophenyl)-,
1-phenyl-2-(3-chlorophenyl)-,
1-phenyl-2-(4-dimethylaminophenyl)-,
1-phenyl-2-(2-chloro-6-fluorophenyl)-,
1-phenyl-2-(2,3-dichlorophenyl)-,
1-phenyl-2-p-tolyl-,
1-phenyl-2-(2,6-dimethylphenyl)-, 1-phenyl-2-(4-methylmercaptophenyl)-, and
1-phenyl-2-(4-trifluoromethylphenyl)-
3,4-dihydronaphthalenes.

EXAMPLE 12

*2 - phenyl - 1 - (p - fluorophenyl) - 1 - hydroxyindane*

Using the procedure described in Example 3, but replacing 2 - phenyl - 6 - methoxy - 1,2,3,4 - tetrahydro - 1-naphthalenone by 2-phenyl-1-indanone (v. Miller and Rohde, Ber. 25, 2095, 1892), there is obtained 2-phenyl-1-(p-fluorophenyl)-1-hydroxyindane.

Similarly, using the procedure described in Example 1, but replacing 2-phenyl-6-methoxy-1,2,3,4-tetrahydro-1-naphthalenone by:
2-(p-fluorophenyl)-,
2-(p-fluorophenyl)-5-methoxy-,
2-(p-fluorophenyl)-6-trifluoromethyl-,
2-(p-fluorophenyl)-6-(1,3-dimethylbutyl)-,
2-p-tolyl-,
2-(p-chlorophenyl)-,
2-(m-trifluoromethylphenyl)-,
2-(p-methylmercaptophenyl)-, and
2-(3-allylphenyl)-1-indanone,
there are obtained:
2-(p-fluorophenyl)-,
2-(p-fluorophenyl)-5-methoxy-,
2-(p-fluorophenyl)-6-trifluoromethyl-,
2-(p-fluorophenyl)-6-(1,3-dimethylbutyl)-,
2-p-tolyl-,
2-(p-chlorophenyl)-,
2-(m-trifluoromethylphenyl)-,
2-(p-methylmercaptophenyl)-, and
2-(3-allylphenyl)-1-hydroxy-1-phenylindane,
respectively.

EXAMPLE 13

*2-phenyl-3-(p-fluorophenyl)indene*

Using the procedure described in Example 4, but replacing 1,2-diphenyl-6-methoxy-1,2,3,4-tetrahydro-1-naphthol by 2 - phenyl - 1 - (p-fluorophenyl)-1-hydroxyindane, there is obtained 2-phenyl-3-(p-fluorophenyl)indene.

Similarly, using the procedure described in Example 4, but replacing 1,2-diphenyl-6-methoxy-1,2,3,4-tetrahydro-1-naphthol by:
2-(p-fluorophenyl)-,
2-(p-fluorophenyl)-5-methoxy-,
2-(p-fluorophenyl)-6-trifluoromethyl-,
2-(p-fluorophenyl)-6-(1,3-dimethylbutyl)-,
2-p-tolyl-,
2-(p-chlorophenyl)-,
2-(m-trifluoromethylphenyl)-,
2-(p-methylmercaptophenyl)-, and
2-(3-allylphenyl)-1-hydroxy-1-phenylindane,
there are obtained:
2-(p-fluorophenyl)-,
2-(p-fluorophenyl)-6-methoxy-,
2-(p-fluorophenyl)-5-trifluoromethyl-,
2-(p-fluorophenyl)-5-(1,3-dimethylbutyl)-,
2-p-tolyl-,
2-(p-chlorophenyl)-,
2-(m-trifluoromethylphenyl)-,
2-(p-methylmercaptophenyl)-, and
2-(3-allylphenyl)-3-phenylindene, respectively.

EXAMPLE 14

*1 - (p - dibutylaminophenyl) - 2 - phenyl - 6 - methoxy-1,2,3,4-tetrahydro-1-naphthol*

Using the procedure described in Example 1, but replacing the Grignard agent from bromobenzene by that from p-bromo-N,N-dibutylaniline (Hellerman et al., J. Am. Chem. Soc. 68, 1890, 1946), there is obtained 1-(p-dibutylaminophenyl) - 2 - phenyl - 6 - methoxy - 1,2,3,4-tetrahydro-1-naphthol. The latter compound is dehydrated using the procedure described in Example 4, to obtain 1 - (p - dibutylaminophenyl) - 2 - phenyl - 6 - methoxy-3,4-dihydronaphthalene.

EXAMPLE 15

*1 - (m - trifluoromethylphenyl) - 2 - phenyl - 6-methoxy - 1,2,3,4 - tetrahydro - 1 - naphthol*

Using the procedure described in Example 1, but replacing the Grignard agent from bromobenzene by that from m-trifluoromethylbromobenzene (Bachman et al., J. Am. Chem. Soc. 69, 2022, 1947), there is obtained 1-(m-trifluoromethylphenyl) - 2 - phenyl - 6 - methoxy - 1,2,3,4-tetrahydro-1-naphthol. The latter compound is dehydrated using the procedure described in Example 4, to obtain 1 - (m - trifluoromethylphenyl) - 2 - phenyl - 6-methoxy-3,4-dihydronaphthalene.

EXAMPLE 16

*1-(3-allylphenyl)-2-phenyl-6-methoxy-1,2,3,4-tetrahydro-1-naphthol*

Using the procedure described in Example 1, but replacing the Grignard agent from bromobenzene by that from 1-bromo-3-allylbenzene (Chemical Abstracts 47, 2131, 1953), there is obtained 1 - (3 - allylphenyl)-2-phenyl - 6 - methoxy-1,2,3,4-tetrahydro-1-naphthol. The latter is dehydrated using the procedure of Example 4, to obtain 1-(3-allylphenyl)-2-phenyl-6-methoxy-3,4 - dihydronaphthalene.

EXAMPLE 17

*1-(2-allyloxyphenyl)-2-phenyl-6-methoxy-1,2,3,4-tetrahydro-1-naphthol*

Using the procedure described in Example 1, but replacing the Grignard agent from bromobenzene by that from 1-bromo-2-allyloxybenzene (Hurd et al., J. Am. Chem. Soc. 58, 941, 1936), there is obtained 1-(2-allyloxyphenyl)-2-phenyl-6-methoxy-1,2,3,4 - tetrahydro - 1-naphthol. The latter is dehydrated using the procedure described in Example 4, to obtain 1-(2-allyloxyphenyl)-2-phenyl-6-methoxy-3,4-dihydronaphthalene.

EXAMPLE 18

*1-(2-methylmercaptophenyl)-2-phenyl-6-methoxy-1,2,3,4-tetrahydro-1-naphthol*

Using the procedure described in Example 1, but replacing the Grignard agent from bromobenzene by that from 1-bromo-2-methylmercaptobenzene (Martin, Iowa State Coll. J. Sci. 21, 38, 1946), there is obtained 1-(2-methylmercaptophenyl) - 2 - phenyl - 6-methoxy-1,2,3,4-tetrahydro-1-naphthol. The latter is dehydrated using the procedure described in Example 4, to obtain 1-(2-methylmercaptopheny)-2 - phenyl - 6-methoxy-3,4-dihydronaphthalene.

EXAMPLE 19

*1,2-diphenyl-6-hydroxy-3,4-dihydronaphthalene*

A mixture of 1,2 - diphenyl-6-methoxy-3,4-dihydronaphthalene and aluminum bromide in benzene is heated according to the procedure described by Sam, J. Am. Chem. Soc. 82, 5205, 1960, to obtain 1,2-diphenyl-6-hydroxy-3,4-dihydronaphthalene.

EXAMPLE 20

*1,2-diphenyl-6-allyloxy-3,4-dihydronaphthalene*

A solution of 1,2 - diphenyl - 6-hydroxy-3,4-dihydronaphthalene in methanol containing a slight excess of sodium methoxide is treated slowly with stirring with an excess of allyl chloride. When the addition is complete, the mixture is heated under reflux for several hours before being cooled and poured into water. The resulting mixture is extracted with ether and the ethereal extract is washed with aqueous sodium hydroxide solution and with water before being evaporated to dryness to yield 1,2-diphenyl-6-allyloxy-3,4-dihydronaphthalene.

EXAMPLE 21

1-(pidimethylaminophenyl)-2-phenyl-6-methoxy-3,4-dihydronaphthalene hydrobromide To a solution of 1 g. of 1-(p-dimethylaminophenyl)-2-phenyl-6-methoxy-3,4-dihydronaphthalene in 100 ml. of ether is added dropwise, with stirring, a slight excess of a 0.1 N ethereal solution of hydrogen bromide. The solid which separates is isolated by filtration, washed with ether, and dried. There is thus obtained 1-(p-dimethylaminophenyl)-2-phenyl-6-methoxy-3,4 - dihydronaphthalene hydrobromide.

In like manner, employing any of the free amino compounds set forth in Examples 7, 8, 9 and 14 and the appropriate acid, there are obtained the corresponding acid addition salts. Illustratively, using procedures analogous to those described above, the amines of Examples 7, 8, 9 and 14 are converted to their acid addition salts with sulfuric, nitric, phosphoric, lactic, benzoic, methanesulfonic, p-toluenesulfonic, salicylic, acetic, propionic, malic, tartaric, citric, cyclohexylsulfamic, succinic, nicotinic and ascorbic acids.

EXAMPLE 22

1-(p-dimethylaminophenyl)-2-phenyl--6-methoxy-3,4-dihydronaphthalene methiodide A solution of 1 g. of 1-(p-dimethylaminophenyl)-2-phenyl-6-methoxy-3,4-dihydronaphthalene in 12 ml. of acetonitrile is cooled in ice. To the cooled solution is added 1.5 ml. of methyl iodide and the mixture is allowed to stand overnight before being poured into 100 ml. of ether. The solid which separates is isolated by filtration and recrystallized from a mixture of acetonitrile and ether. There is thus obtained 1 - (p - dimethylaminophenyl) - 2 - phenyl-6-methoxy-3,4-dihydronaphthalene methiodide in the form of a crystalline solid.

Similarly, using the above procedure, but replacing methyl iodide by ethyl bromide, propyl bromide, allyl bromide, and benzyl bromide, there are obtained the ethobromide, propyl bromide, allyl bromide, and benzyl bromide, respectively, of 1-(p-dimethylaminophenyl)-2-phenyl-6-methoxy-3,4-dihydronaphthalene.

Similarly, using the procedure described in Example 22, but replacing 1-(p-dimethylaminophenyl)-2-phenyl-6-methoxy-3,4 - dihydronaphthalene by any of the free bases prepared as described in Examples 7, 8, 9 and 14, there are obtained the corresponding methiodides and like quaternary ammonium salts.

EXAMPLE 23

1-(p-dimethylaminophenyl)-2-phenyl-6-methoxy-3,4-dihydronaphthalene methochloride A solution of 1 g. of 1-(p-dimethylaminophenyl)-2-phenyl-6-methoxy-3,4-dihydronaphthalene methiodide in dimethylformamide is shaken with a suspension of silver oxide until the precipitation of silver iodide is complete. The resulting mixture is filtered and the filtrate containing the corresponding quaternary ammonium hydroxide is neutralized by the addition of aqueous hydrochloric acid. The resulting mixture is evaporated to dryness to obtain 1-(p-dimethylaminophenyl)-2-phenyl-6 - methoxy-3,4-dihydronaphthalene methochloride.

Similarly, using the above procedure, but replacing hydrochloric acid by other acids such as sulfuric acid, hydrobromic acid, phosphoric acid, acetic acid, methanesulfonic acid, and the like, there are obtained the corresponding quaternary ammonium salts.

In like manner, using the above procedure, the anion of any of the quaternary salts of the invention can be exchanged by any other desired anion by forming the corresponding quaternary ammonium hydroxide and reacting the latter with the appropriate acid.

EXAMPLE 24

1 - [p - (pyrrolidinomethyl)phenyl] - 2 - phenyl - 6 - methoxy-3,4-dihydronaphthalene and the hydrochloride thereof A solution of the Grignard reagent prepared from 4.80 g. of p-(pyrrolidinomethyl)bromobenzene and 0.5 g. of magnesium in 50 ml. of tetrahydrofuran was cooled in ice. To this solution was added a solution of 5.0 g. of 2-phenyl-6-methoxy-1,2,3,4-tetrahydro - 1 - naphthalenone in 50 ml. of tetrahydrofuran. The resulting mixture was stirred overnight at room temperature before being treated with 3 ml. of water and filtered through Celite. The filtrate was diluted with ether and washed with water and saturated aqueous sodium chloride solution before being evaporated to dryness. The residue was washed with a total of 300 ml. of ether and the ethereal solution so obtained was then extracted with aqueous 2.5 N hydrochloric acid. The acid extract was washed with several portions of methylene chloride. The methylene chloride extracts were evaporated to dryness and the residue was recrystallized twice from a mixture of methylene chloride and ethyl acetate. There was thus obtained 1.65 g. of 1 - [p - (pyrrolidinomethyl)phenyl] - 2 - phenyl - 6 - methoxy-3,4-dihydronaphthalene hydrochloride having a melting point of 230 to 233° C.

*Analysis.*—Calcd. for $C_{28}H_{30}ClNO$: C, 77.85; H, 7.00. Found: C, 77.11; H, 6.83.

The free base was isolated from the hydrochloride by dissolving the latter in methylene chloride, washing the methylene chloride solution with aqueous sodium bicarbonate solution and evaporating the methylene chloride solution to dryness.

I claim:
1. A compound selected from the class consisting of
(a) compounds having the formula

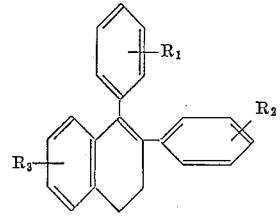

wherein $R_1$ is selected from the class consisting of hydrogen, lower-alkyl, trifluoromethyl, lower-alkenyl, lower-alkenyloxy, halogen, lower-alkylmercapto,

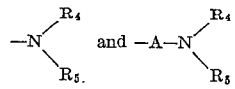

wherein $R_4$ and $R_5$ taken individually represent lower-alkyl and $R_4$ and $R_5$ taken together with the attached nitrogen atom represent a heterocyclic radical selected from the class consisting of pyrrolidino, lower-alkylpyrrolidino, piperazino, lower-alkylpiperazino, piperidino, lower-alkylpiperidino, morpholino, hexamethylenimino, homopiperazino, and homomorpholino, and A is an alkylene group containing from 1 to 6 carbon atoms, inclusive; $R_2$ represents one or two substituents selected from the class consisting of hydrogen, lower-alkyl, trifluoromethyl, lower-alkenyl, lower-alkenyloxy, halogen, lower-alkylmercapto and

wherein $R_4$ and $R_5$ have the significance above defined; $R_3$ represents one or two substituents selected from the class consisting of hydrogen, hydroxy, lower-alkyl, trifluoromethyl, lower-alkenyl, lower-alkoxy lower-alkenyloxy, halogen, lower-alkylmercapto and

wherein $R_4$ and $R_5$ have the significance above defined, provided that $R_1$, $R_2$ and $R_3$ do not each represent hydrogen simultaneously, (b) the addition salts with pharmacologically acceptable acids of those compounds of the above formula which contain a tertiaryamino substituents, (c) the quaternary ammonium salts obtained by reacting the free bases of the above formula with a member selected from the group consisting of lower-alkyl halides, lower-alkenyl halides, di(lower-alkyl) sulfates, aralkyl halides, and lower-alkyl arylsulfonates.

2. 1,2-diphenyl-6-methoxy-3,4-dihydronaphthalene.

3. 1 - (p - tolyl) - 2 - phenyl - 6 - methoxy - 3,4 - dihydronaphthalene.

4. 1 - (p - fluorophenyl) - 2 - phenyl - 6 - methoxy-3,4-dihydronaphthalene.

5. A compound selected from the class consisting of 1 - (p - dimethylaminophenyl) - 2 - phenyl - 6 - methoxy-3,4-dihydronaphthalene and the addition salts thereof with pharmacologically acceptable acids.

6. 1 - (p - dimethylaminophenyl) - 2 - phenyl - 6 - methoxy-3,4-dihydronaphthalene.

7. 1 - (p - dimethylaminophenyl) - 2 - phenyl - 6 - methoxy-3,4-dihydronaphthalene hydrochloride.

8. A compound selected from the class consisting of 1 - [p - (3 - pyrrolidinopropyl)phenyl] - 2 - phenyl - 6-methoxy-3,4-dihydronaphthalene and the addition salts thereof with pharmacologically acceptable acids.

9. 1 - [p - (3 - pyrrolidinopropyl)phenyl] - 2 - phenyl-6-methoxy-3,4-dihydronaphthalene.

10. 1 - [p - (3 - pyrrolidinopropyl)phenyl] - 2 - phenyl-6-methoxy-3,4-dihydronaphthalene hydrochloride.

11. 1 - [p - (3 - pyrrolidinopropyl)phenyl] - 2 - phenyl-6-methoxy-3,4-dihydronaphthalene hydriodide.

12. A compound selected from the class consisting of 1 - [p - (pyrrolidinomethyl)phenyl] - 2 - phenyl - 6 - methoxy-3,4-dihydronaphthalene and the addition salts thereof with pharmacologically acceptable acids.

13. 1 - [p - (pyrrolidinomethyl)phenyl] - 2 - phenyl-6-methoxy-3,4-dihydronaphthalene.

14. 1 - [p - (pyrrolidinomethyl)phenyl] - 2 - phenyl-6-methoxy-3,4-dihydronaphthalene hydrochloride.

15. A compound selected from the class consisting of
(a) compounds having the formula

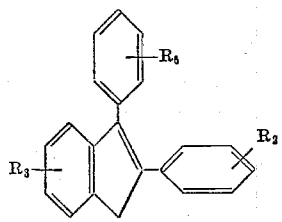

wherein $R_2$ represents one or two substituents selected from the class consisting of hydrogen, lower-alkyl, trifluoromethyl, lower-alkenyl, lower-alkenyloxy, halogen, lower-alkylmercapto and

wherein $R_4$ and $R_5$ taken individually represent lower-alkyl and $R_4$ and $R_5$ taken together represent a heterocyclic radical selected from the class consisting of pyrrolidino, lower-alkylpyrrolidino, piperazino, lower-alkylpiperazino, piperidino, lower-alkylpiperidino, morpholino, hexamethylenimino, homopiperazino, and homomorpholino; $R_3$ represents one or two substituents selected from the class consisting of hydrogen, hydroxy, lower-alkyl, trifluoromethyl, lower-alkenyl, lower-alkoxy, lower-alkenyloxy, halogen, lower-alkylmercapto and

wherein $R_4$ and $R_5$ have the significance above defined; $R_6$ represents

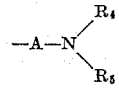

wherein A is an alkylene group containing from 1 to 6 carbon atoms, inclusive, and $R_4$ and $R_5$ have the significance above defined, (b) the addition salts with pharmacologically acceptable acids, (c) the quaternary ammonium salts obtained by reacting the free bases of the above formula with a member selected from the group consisting of lower-alkyl halides, lower-alkenyl halides, di(lower-alkyl) sulfates, aralkyl halides, and lower-alkyl arylsulfonates.

16. A compound according to claim 1 wherein $R_1$ is

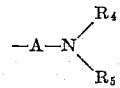

as defined in claim 1.

References Cited by the Examiner

Davies et al.: J. Chem. Soc. (London), 1947, p. 1697, QD1.C6.

Noller: Chemistry of Organic Compounds, 1957, QD.253–N65, pp. 104, 199.

Solmssen: Chem. Reviews, 37:569 (1945), QD1.A563.

ALEX MAZEL, *Primary Examiner.*

HENRY R. JILES, *Examiner.*

J. A. NARCAVAGE, *Assistant Examiner.*